(12) United States Patent
Nakagawa

(10) Patent No.: US 9,864,499 B2
(45) Date of Patent: Jan. 9, 2018

(54) DISPLAY CONTROL APPARATUS AND CONTROL METHOD FOR THE SAME

(71) Applicant: CANON KABUSHIKI KAISHA, Tokyo (JP)

(72) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 14/281,590

(22) Filed: May 19, 2014

(65) Prior Publication Data

US 2014/0351698 A1 Nov. 27, 2014

(30) Foreign Application Priority Data

May 23, 2013 (JP) ................................. 2013-109389

(51) Int. Cl.
G06F 3/048 (2013.01)
G06F 3/0485 (2013.01)
G06F 3/0488 (2013.01)
G06F 3/01 (2006.01)

(52) U.S. Cl.
CPC ............ *G06F 3/0485* (2013.01); *G06F 3/016* (2013.01); *G06F 3/0488* (2013.01)

(58) Field of Classification Search
CPC ..................................................... G06F 3/048
See application file for complete search history.

(56) References Cited

U.S. PATENT DOCUMENTS

| 2003/0043174 A1* | 3/2003 | Hinckley | G06F 3/03547 345/684 |
| 2009/0292990 A1* | 11/2009 | Park | G06F 3/016 715/702 |
| 2010/0267424 A1* | 10/2010 | Kim | G06F 3/016 455/566 |
| 2011/0202834 A1* | 8/2011 | Mandryk | G06F 3/04883 715/701 |
| 2012/0036473 A1* | 2/2012 | Haseyama | G06F 3/016 715/784 |
| 2012/0050324 A1* | 3/2012 | Jeong | G06F 17/30 345/633 |

(Continued)

FOREIGN PATENT DOCUMENTS

| CN | 101616213 A | 12/2009 |
| CN | 102449587 A | 5/2012 |
| JP | 2003-084901 A | 3/2003 |

(Continued)

OTHER PUBLICATIONS

The above foreign patent documents were cited in a Oct. 8, 2016 Chinese Office Action, a copy of which is enclosed with an English Translation, that issued in Chinese Patent Application No. 201410218473.9.

(Continued)

*Primary Examiner* — Xuyang Xia
(74) *Attorney, Agent, or Firm* — Cowan, Liebowitz & Latman, P.C.

(57) ABSTRACT

A user is notified with a tactile sensation in the case where a display position of a boundary preset in a display object passes through a predetermined position as a result of scrolling of the display object according to a command. The user is thereby more easily able to locate a desired item from among items that are scrolled.

12 Claims, 8 Drawing Sheets

(56) References Cited

U.S. PATENT DOCUMENTS

2012/0075352 A1* 3/2012 Mizutani ............... G06F 3/0488
  345/684

FOREIGN PATENT DOCUMENTS

| JP | 2006-252366 A | 9/2006 |
| JP | 2013-058154 A | 3/2013 |
| JP | 2013-131012 A | 7/2013 |

OTHER PUBLICATIONS

The documents cited herein were cited in the Feb. 17, 2017 Japanese Office Action, a copy of which is enclosed without an English Translation, that issued in Japanese Patent Application No. 2013109389.

* cited by examiner

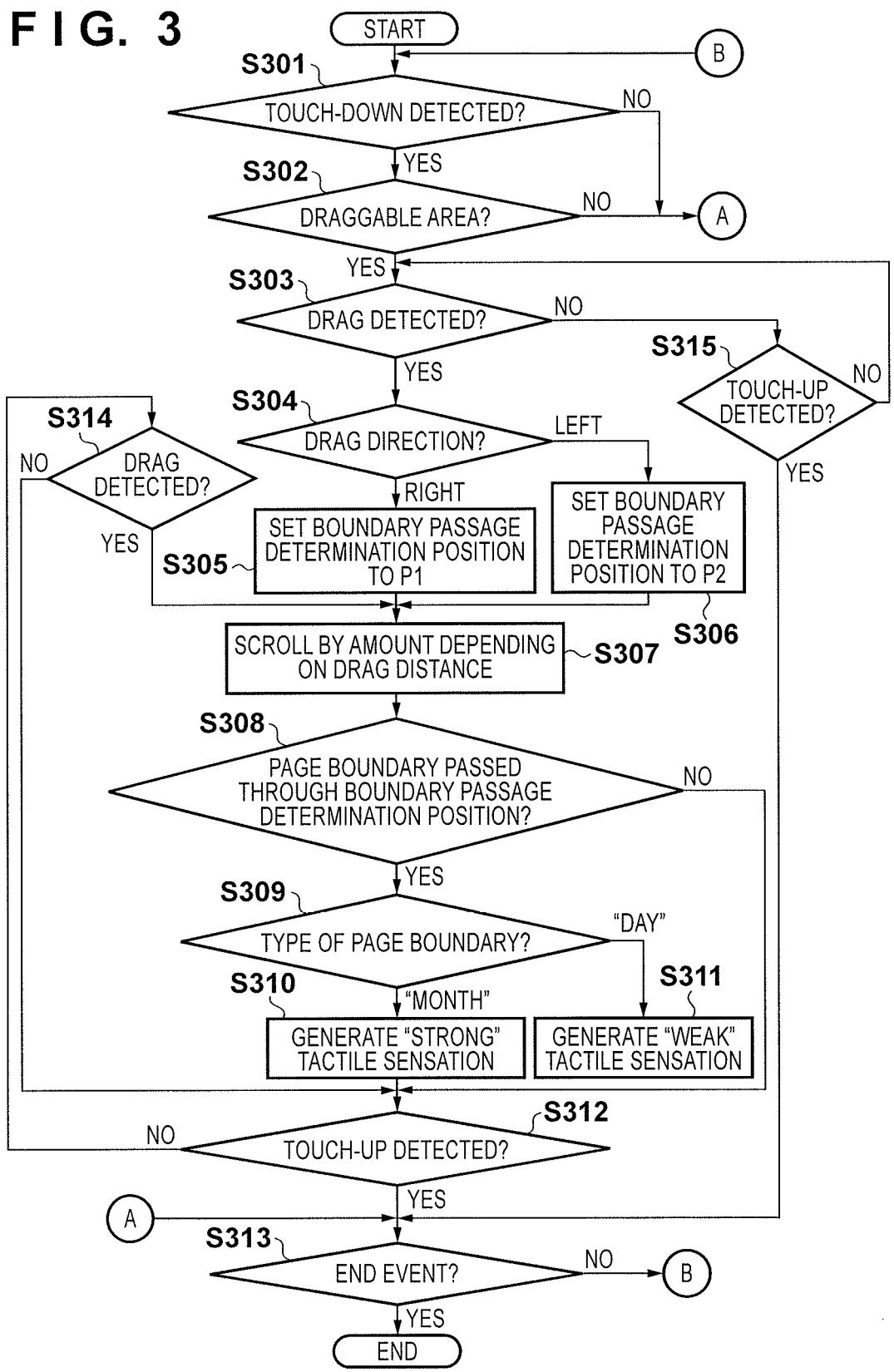

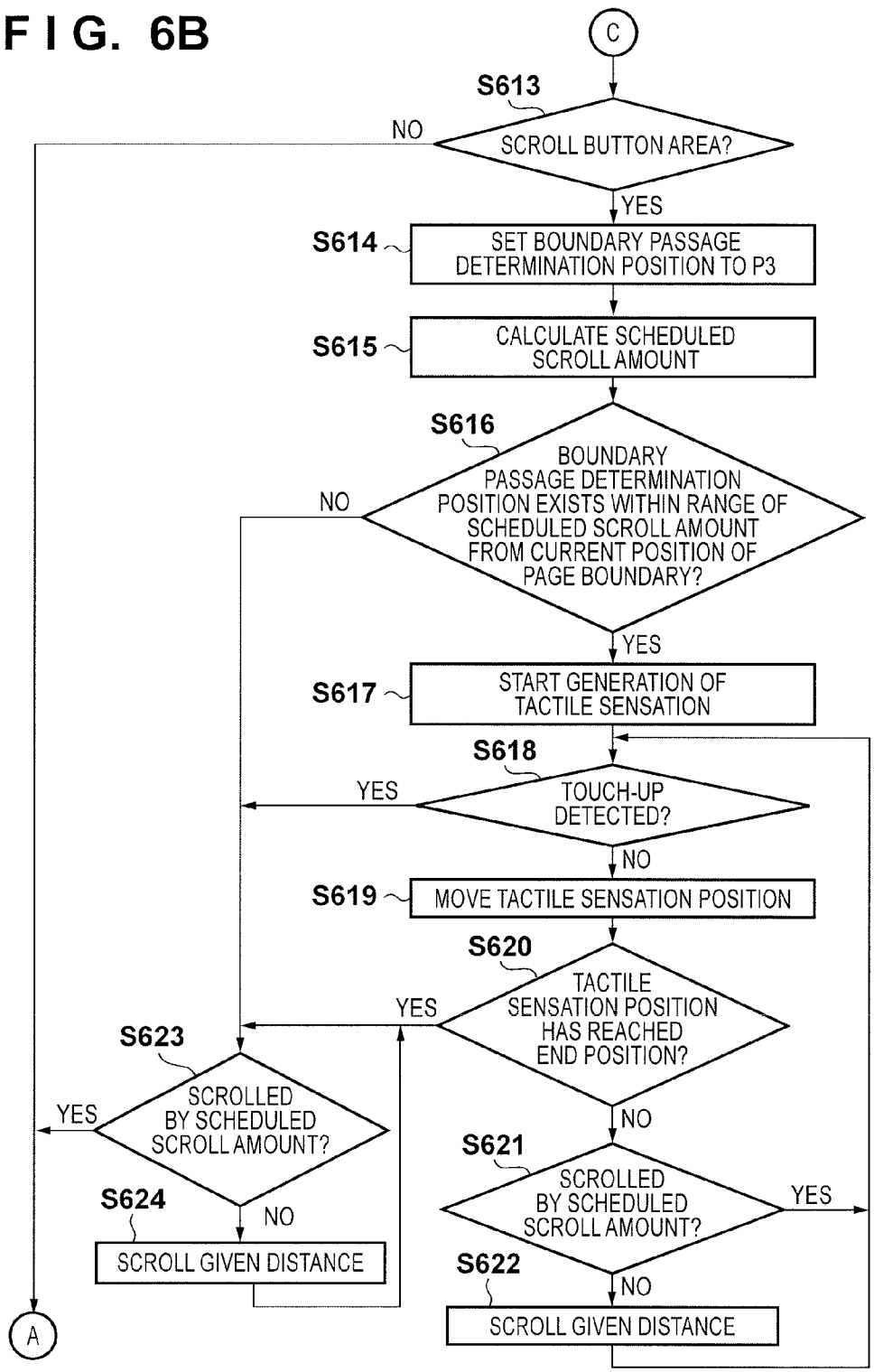

DISPLAY CONTROL APPARATUS AND CONTROL METHOD FOR THE SAME

BACKGROUND OF THE INVENTION

Field of the Invention

The present invention relates to a display control apparatus and a control method for the same, and more particularly to a display control apparatus using a touch panel and a control method for the same.

Description of the Related Art

In recent years, an increasing number of devices have a display unit equipped with a touch panel, in order to achieve effects such as securing a large display area without enlarging the device and realizing intuitive operation. With a device having a display unit equipped with a touch panel, the sense that the user is directly operating graphical user interfaces (GUIs) displayed on the display unit with his or her finger or the like can be provided, given the correspondence between input coordinates on the touch panel and image coordinates on the display unit.

For example, when a screen containing a plurality of menu items is displayed, the user can be provided with the sense of directly operating menu items on the screen, by performing operations with a menu item corresponding to input coordinates detected on the touch panel as the selected menu item.

When operating GUI items on a touch panel, users mostly use a finger. Since a fingertip is much larger than the tip of a mouse cursor, selecting a desired item from densely arranged GUI items is not easy. Thus, there are apparatuses using a touch panel that prevent erroneous operation by increasing the size of selectable GUI items or opening up space between adjacent GUI items. In this case, the number of GUI items (menu items, thumbnail images, etc.) that can be displayed on one screen is less than a device in which GUI items are operated using a pointing device such as a mouse.

In the case where there are thus items that do not fit within one screen, scrolling the display of the screen in correspondence with a drag or a flick operation is also known, although it is not always easy to perform a drag or a flick so that a desired screen is displayed.

In the case where the display of the menu screen is cyclically scrolled, a configuration that enables the boundary position between the top of the menu and the end of the menu to be grasped, by momentarily stopping scrolling of the screen at the boundary portion between the top and the end has been proposed (Japanese Patent Laid-Open No. 2006-252366).

However, with the method described in Japanese Patent Laid-Open No. 2006-252366, there is a problem in that since scrolling of the screen momentarily stops when the menu has been scrolled through once, users who want to pass quickly through the boundary may become frustrated. Also, this becomes even more of a problem in the case of wanting to provide a plurality of boundaries.

One alternative method to stopping scrolling is to design the screen so as to make the boundaries more visible. For example, conceivable methods include demarking the boundary with a conspicuously colored line or changing the color scheme of display items in adjacent areas. However, there is a problem in that limits are placed on screen design.

SUMMARY OF THE INVENTION

The present invention has been made in view of the above problems with conventional technology. The present invention provides a display control apparatus that allows a user to easily find a desired item from among items being scrolled by a method using means other than display, and a control method for the same.

According to an aspect of the present invention, there is provided a display control apparatus capable of scrolling a display object according to an input command, comprising: a generation unit configured to generate stimulation perceivable as a tactile sensation by a user who operates the display control apparatus; and a control unit configured to control the generation unit so as to generate the stimulation in a case where a position of a boundary of a scrolled object passes through a predetermined position as a result of scrolling according to the command.

According to another aspect of the present invention, there is provided a display control apparatus capable of scrolling a display object containing a plurality of items according to an input command, comprising: a generation unit configured to generate stimulation perceivable as a tactile sensation by a user who operates the display control apparatus; and a control unit configured to perform control so as to cause stimulation that differs according to a category to which an item displayed in a predetermined position, among the plurality of items, belongs to be generated by the generation unit.

According to a further aspect of the present invention, there is provided a method of controlling a display control apparatus that is capable of scrolling a display object according to an input command and that has a generation unit configured to generate stimulation perceivable as a tactile sensation by a user who operates the display control apparatus, comprising: a control step of performing control so as to cause the stimulation to be generated by the generation unit, in a case where a position of a preset boundary of the scroll target passes through a predetermined position as a result of scrolling according to the command.

According to another aspect of the present invention, there is provided a method of controlling a display control apparatus that is capable of scrolling a display object containing a plurality of items according to an input command and that has a generation unit configured to generate stimulation perceivable as a tactile sensation by a user who operates the display control apparatus, comprising: a control step of performing control so as to cause stimulation that differs according to a category to which an item displayed in a predetermined position, among the plurality of items, belongs to be generated by the generation unit.

Further features of the present invention will become apparent from the following description of exemplary embodiments with reference to the attached drawings.

BRIEF DESCRIPTION OF THE DRAWINGS

FIG. 3 is a flowchart for describing a scroll display operation in the display control apparatus according to the first embodiment of the present invention.

FIGS. 6A and 6B are flowcharts for illustrating scroll display operations in the display control apparatus according to the second embodiment of the present invention.

DESCRIPTION OF THE EMBODIMENTS

Exemplary embodiments of the present invention will now be described in detail in accordance with the accompanying drawings.

First Embodiment

Figure 1:
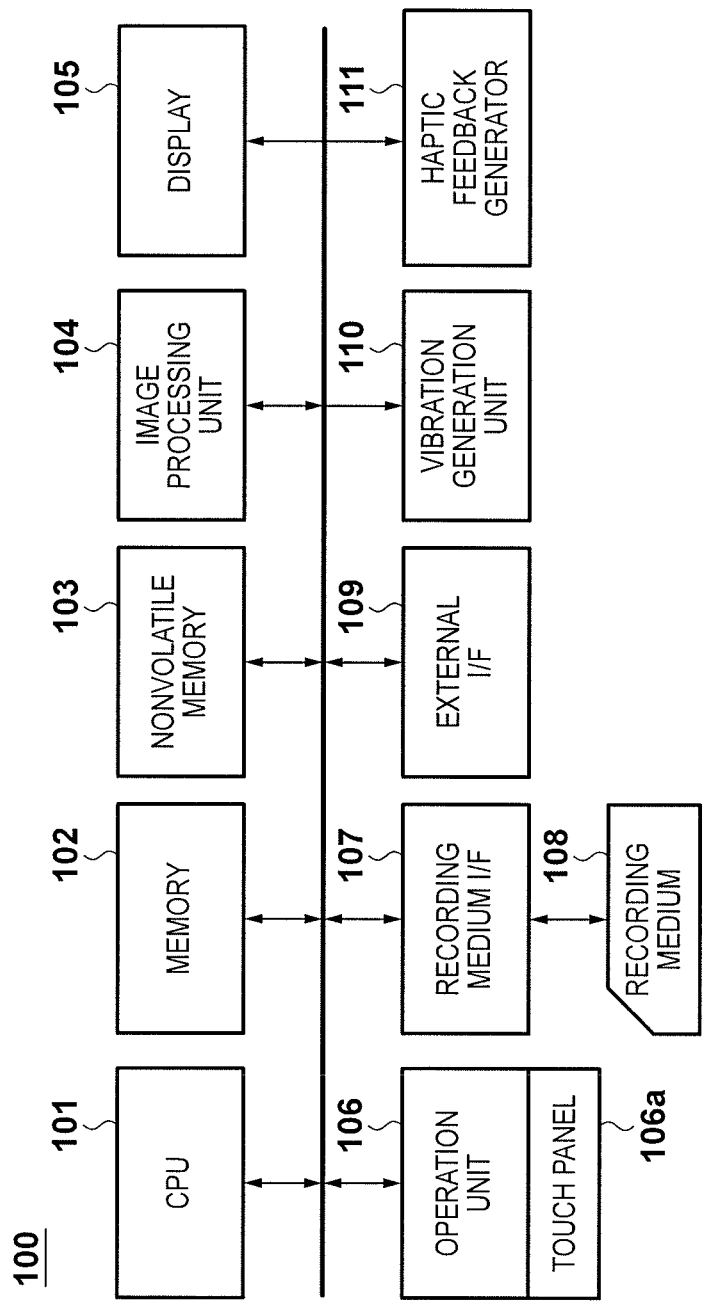
FIG. 1 is a block diagram showing an exemplary functional configuration of a display control apparatus according to a first embodiment of the present invention.

FIG. 1 is a block diagram showing an exemplary functional configuration of a display control apparatus 100 according to a first embodiment of the present invention. The present invention is applicable to any electronic device having a display apparatus and a touch-sensitive input apparatus such as a touch panel, and the display control apparatus 100 may be any apparatus that meets this condition. Non-limiting examples of such devices include desktop computers, notebook computers, tablets, PDAs, media players, game machines, mobile phones, digital cameras, printers, cars and home electronics.

A CPU 101, a memory 102, a nonvolatile memory 103, an image processing unit 104, a display 105, an operation unit 106, a recording medium I/F 107, an external I/F 109, a vibration generation unit 110 and a haptic feedback generator 111 are respectively connected to an internal bus 150. These components connected to the internal bus 150 are able to transmit and receive data with respect to each other via the internal bus 150.

The memory 102 consists of a RAM (volatile memory utilizing a semiconductor device, etc.), for example. The CPU 101 realizes the operations of the display control apparatus 100 which will be discussed later, by controlling the components of the display control apparatus 100 in accordance with programs stored in the nonvolatile memory 103, for example, using the memory 102 as a work memory. The nonvolatile memory 103 stores image data, audio data and other data, various programs that are executed by the CPU 101, and the like. The nonvolatile memory 103 can be constituted by a hard disk drive (HDD), a solid-state drive (SSD) or a ROM (including rewritable ROM such as EEPROM), for example.

The image processing unit 104 performs various image processing on image data stored in the nonvolatile memory 103 or a recording medium 108, video signals acquired via the external I/F 109, and the like, under the control of the CPU 101. The image processing that is performed by the image processing unit 104 includes A/D conversion, D/A conversion, encoding of image data, compression, decoding, enlargement/reduction (resizing), noise reduction, color conversion, and the like. The image processing unit 104 may be constituted by dedicated circuit blocks for performing specific image processing. Also, at least some of the image processing may be realized by the CPU 101 executing an image processing program, rather than using the image processing unit 104.

The display 105 displays GUI (Graphical User Interface) images and the like that are used by application programs and the OS, apart from images, text and the like recorded on the recording medium 108, for example, under the control of the CPU 101. The CPU 101 controls the various components of the display control device 100 so as to generate video signals for displaying on the display 105 in accordance with a program and output the video signals to the display 105. The display 105 displays video images based on the output video signals. Note that a configuration may be adopted in which the display 105 is an external apparatus, and the display control device 100 outputs video signals for display on the display 105.

The operation unit 106 is an input device for accepting user operations, and includes a text information input device such as a keyboard, a pointing device such as a mouse or a touch panel 106a, buttons, dials, a joy stick, a touch sensor, and a touchpad. Note that, in the present embodiment, the touch panel 106a is transparent or translucent and is disposed on the display screen of the display 105 such that the display screen is visible, but may be opaque and disposed in different position to the display 105. Also, the touch panel 106a outputs the coordinate information of touch inputs, with the relationship between the coordinate information output by the touch panel 106a and the display coordinates of the display 105 being well-known. The touch panel 106a may be of a type that, in the case where inputs are simultaneously received with respect to a plurality of different positions, is capable of outputting coordinate information for the individual inputs, or may be of a type that outputs only coordinate information for one input.

Any touch panel employing one of various well-known methods, such as a resistive method, a capacitive method, a surface acoustic wave method, an infrared method, an inductive method, an image recognition method or an optical sensor method, can be used for the touch panel 106a.

The recording medium I/F 107 performs reading out and writing of data with respect to a removable recording media 108 such as a memory card, CD or DVD, under the control of the CPU 101. The external I/F 109 is an interface for performing input and output of video signals and audio signals with respect to an external apparatus that is connected by cable or wireless.

The vibration generation unit 110 consists of a motor and a weight connected thereto, and the weight rotates as a result of current being sent to the motor and vibrates the entire display control apparatus 100. By controlling the current sent to the motor by the CPU 101, it is possible to generate various kinds of vibrations and provide various tactile sensations (stimulation) to the hand of the user who is holding the apparatus. Note that a component that generates bending vibration of the touch panel 106a, rather than vibrating the entire display control apparatus 100, through application of a voltage to a piezo-electric element may be used as the vibration generation unit 110. The touch panel can be made to vibrate with various vibration patterns by changing the applied voltage, and various tactile sensations (stimulation) can be generated as feedback.

The haptic feedback generator 111 employing the electrical tactile sensation generation method consists of a conductive layer panel and an insulator panel, and is able to charge the conductive layer with positive charge. These two panels are disposed by being overlaid on the display 105 similarly to the touch panel 106a, and electrical stimulation can be applied when the user touches the insulator panel by the positive charge with which the conductive layer panel is charged. Also, it is possible to provide the sense of the skin being pulled by a Coulomb force.

Each position of the conductive layer panel can be selectively charged with a positive charge, and by the CPU 101 controlling selection, the sense of a virtual coarse surface, the sense of virtual bumps (a rougher tactile sensation than the sense of a virtual coarse surface) and the like can be provided to the user's finger(s) or the like touching the touch panel 106a. Also, by selectively charging each position of the conductive layer panel with a positive charge, it is possible to provide tactile sensations locally rather than to the entire area being touched and to also change the position to which a tactile sensation is provided within the touched surface, enabling a variety of tactile sensations to be provided to the user.

The vibration generation unit 110 and the haptic feedback generator 111 are devices that provide mechanical or electrical stimulation (feedback) that can be perceived as a tactile sensation by the user who is touching the touch panel 106a or holding the display control apparatus 100. Accordingly, the vibration generation unit 110 and the haptic feedback generator 111 both function as haptic feedback generators. Although FIG. 1 shows an example in which the display control apparatus 100 is equipped with both the vibration generation unit 110 and the haptic feedback generator 111, processing discussed later is realizable with only tactile sensations that are generated by either of these components. That is, the present invention is also realizable with an apparatus that is equipped with either the vibration generation unit 110 or the haptic feedback generator 111.

In the present embodiment, the CPU 101 is able to detect the following operations/states with respect to the touch panel 106a.

An object touching the touch panel 106a (hereinafter, "touch-down").

The state of an object touching the touch panel 106a (hereinafter, "touch-on").

Movement of the touch position while the object remains in contact with the touch panel 106a (movement of the touch position while in a touch-on state; hereinafter, "move").

Transition from a state where an object is touching the touch panel 106a to a non-touching state (hereinafter, "touch-up").

A state where the touch panel 106a is not being touched (hereinafter, "touch-off").

Touch-on at two points simultaneously and narrowing of the distance between the two points that are being touched (hereinafter, "pinch-in").

Touch-on at two points simultaneously and widening of the distance between the two points that are being touched (hereinafter, "pinch-out").

Also, a touch-down and a touch-up at a plurality of points will be referred to hereinafter as a "multi-touch-down" and a "multi-touch-up", respectively. Also, an operation at a plurality of points and a touch-on at a plurality of points will be referred as a "multi-touch" and a "multi-touch-on", respectively. The information relating to states and operation of the touch panel 106a and the coordinates of positions where an object (generally user's finger or stylus pen) touches the touch panel 106a are notified to the CPU 101 through the internal bus 150. The CPU 101 determines what kind of operation was performed on the touch panel 106a, based on the notified information.

With regard to move, the CPU 101 is able to determine the movement direction (movement direction of touch point) of a finger or pen that moves while remaining in contact with the touch panel 106a, separately for the vertical component and the horizontal component of the touch panel 106a, based on the change in the position coordinates.

In the present embodiment, a series of states and specific patterns that are detectable by the touch panel 106a are regarded as touch operations. For example, a continuous change in the state of the touch panel 106a from touch-down to touch-on, move and then touch-up is regarded as a touch operation called stroke drawing. A quick stroke drawing operation is also called a flick. A flick is an operation that involves touching the touch panel, quickly moving a certain distance while remaining in contact with the touch panel, and then releasing the contact, and can be described as an operation involving quickly tracing over the touch panel with a flick-like gesture of a finger. The CPU 101 is able to determine that a flick operation has been performed when a move over a predetermined distance or more at a predetermined speed or faster is detected, followed directly by a touch-up. Also, a move of less than the predetermined speed will be determined to be a normal move (drag) operation. Also, the correspondence of other touch operations with the patterns of states of the touch panel 106a mentioned above is assumed to be registered in advance in the nonvolatile memory 103. For example, detection of a touch-off within a predetermined time period after a touch-down is regarded as a tap operation, and detection of a touch-off on or after the predetermined time period is not regarded as a tap operation.

In the present embodiment, items are displayed in units of date, such as in the case of displaying thumbnail images on the display 105 by shooting day. Display of a display object is scrolled by a user's move (drag) operation, and the apparatus is vibrated when the date of the images being displayed changes. The user can thereby know that a change has occurred by a tactile sensation felt through the finger that is performing the move (drag) operation (or through the stylus that he or she is holding). Note that, in this specification, "display objects" refer to images that are targeted for scrolling. Also, a "screen" in this specification consists of the contents that are displayed, and is included in the display objects. Further, in this specification, unless otherwise specified, the direction of scroll refers to the directions that the displayed content moves in the window, not the direction that the window moves relative to the displayed content. For example, scrolling "up" causes the displayed content to move in upward direction so that new content appears from the bottom of screen and that the content that was displayed at the top of the screen disappears.

Figure 2A:
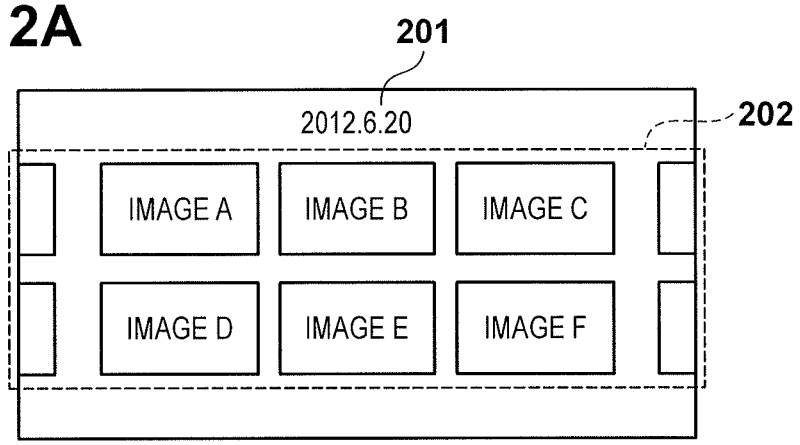
FIGS. 2A to 2C are diagrams showing exemplary thumbnail display screens in the display control apparatus according to the first embodiment of the present invention.

FIG. 2A shows an exemplary thumbnail display screen in the display control apparatus 100 of the present embodiment. A plurality of thumbnail images are displayed so as to be aligned on the page (area) by shooting day. Here, the size of the "page" changes depending on the number and size of corresponding thumbnail images, and may or may not fit within the display area.

The shooting day of displayed images is displayed in a date display area 201, and in the example of FIG. 2A, displayed images A to F are images that were captured on Jun. 20, 2012. An area 202 is an area of the touch panel 106a that can accept drag operations on the thumbnail display screen. The user can scroll the entire screen or the thumbnail display area to the right or left by carrying out a drag operation to the left or right within the area 202. In this case, the entire screen or the thumbnail display area is the display object.

Figure 2B:
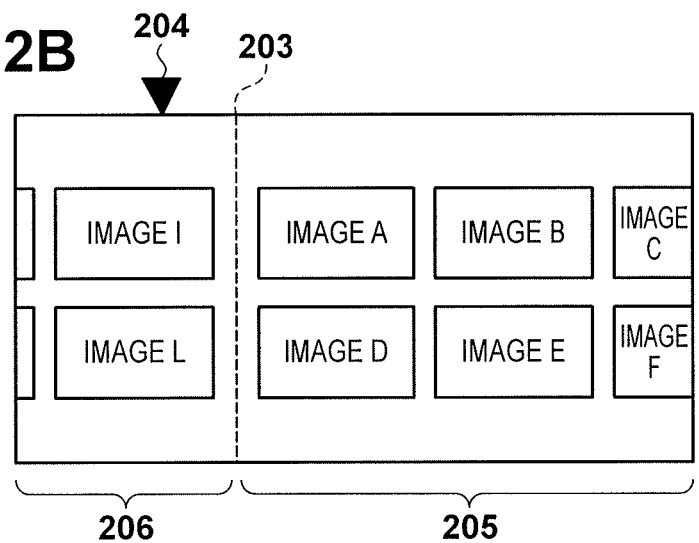

FIG. 2B shows exemplary display in the case where a drag operation to the right is performed from the state of FIG. 2A. The display images are scrolled by the drag operation, with images C and F moving partially outside the display area, and images I and image L becoming fully visible. Reference numeral 205 denotes the range of thumbnail images of images captured on Jun. 20, 2012, and reference numeral 206 denotes the range of thumbnail images of images captured on Jun. 19, 2012. Reference numeral 203 denotes the boundary between pages (in this case, the boundary between shooting days), and is located at the boundary between the range 205 and the range 206. Note that the boundary 203 may be displayed in practice but does not need to be.

A mark 204 represents a predetermined boundary passage determination position on the touch panel (mark 204 is also not displayed, as indicated by it being shown outside the display area). The boundary passage determination position corresponding to the mark 204 is given as P1. Note that the boundary passage determination position P1 is specified with a horizontal coordinate defined in the display area. Also, the horizontal coordinate is assumed to become larger from left edge of the display area to the right edge of the display area. The CPU 101 determines whether the page has changed (whether the date of displayed images has changed) when the page boundary represented by 203 passes through the passage determination position P1 from left to right, and controls the vibration generation unit 110 to generate vibrations.

Specifically, the CPU 101 is able to control the vibration generation unit 110 to generate vibrations, when the horizontal coordinate of the display position of the page boundary 203 equals the horizontal coordinate defining the boundary passage determination position P1 during rightward scrolling of the display screen. Alternatively, the CPU 101 may be generate vibrations when the horizontal coordinate of the display position of the page boundary 203 changes from a state of being less than or equal to the horizontal coordinate defining the boundary passage determination position P1 to a state of exceeding the horizontal coordinate defining the boundary passage determination position P1.

Note that, in the present embodiment, weak vibrations (hereinafter, given as "weak" tactile sensation) are generated in the case where the boundary that passes through the boundary passage determination position P1 is only a change in "day", and large vibrations (hereinafter, given as "strong" tactile sensation) are generated in the case where the boundary is a change in "month" as well as a change in "day". The user is thereby able to recognize that the "day" and/or the "month" have changed through the vibration of the apparatus, when scrolling with a drag operation, making it easy to find a desired image. When sorting by "year", "month", "day" and "time", "month" is an upper-rank sorting criterion higher than "day", and "day" is a sorting criterion of a lower rank than "month". In this way, a user can be intuitively made to recognize the rank of the boundary that has been crossed, by providing a tactile sensation of stronger stimulation in the case of crossing an upper-rank sorting boundary than in the case of crossing a lower-rank sorting boundary.

Figure 2C:
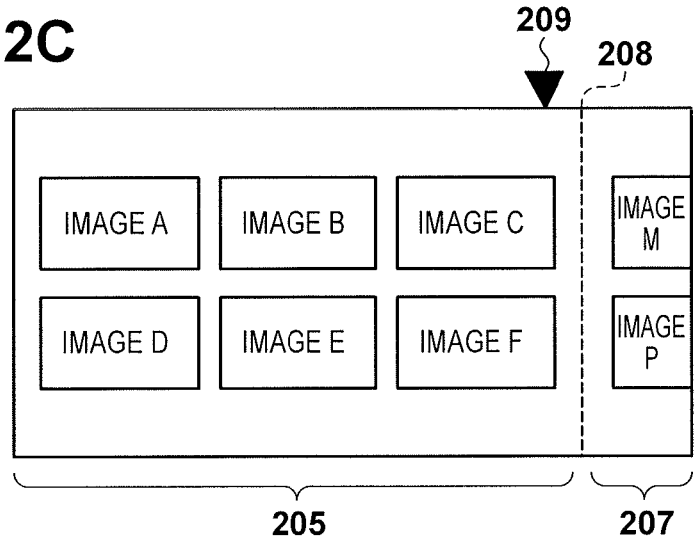

FIG. 2C shows exemplary display in the case where a drag operation has been performed to the left side in the state of FIG. 2A. That is, exemplary display in the case where a drag operation has been performed in the opposite direction to the state from FIG. 2A to FIG. 2B is shown. The display images are scrolled by the drag operation, with images A to F moving to the left side of the display area, images I and L moving outside the display area, and images M and P newly appearing on the right side of the display area. Reference numeral 205 denotes the range of thumbnail images of images captured on Jun. 20, 2012, and reference numeral 207 denotes the range of thumbnail images of images captured on Jul. 7, 2012. Reference numeral 208 denotes the boundary between pages (in this case, the boundary between shooting days and shooting months of images), and is located at the boundary between the range 205 and the range 207. Note that the boundary 208 may be displayed in practice but does not need to be.

A mark 209 represents a predetermined boundary passage determination position. Different from the mark 204, the mark 209 is located on the right side of the display area, this being to allow the user to be informed sooner that there has been a change in the "month" and/or "day", due to the boundary passage determination position during a drag operation to the left side being different from that during a drag operation to the right side. The boundary passage determination position corresponding to the mark 209 is given as P2. P2 is set more on the upstream side relative to the current scrolling (left scrolling) than P1 set when scrolling in the opposite direction (right scrolling). The boundary passage determination position P2 is also specified with a horizontal coordinate defined in the display area. The CPU 101 judges that there has been a change in page when the page boundary represented by reference numeral 208 passes through the boundary passage determination position P2 from right to left (here, a change in the month of the displayed images), and controls the vibration generation unit 110 to generate vibrations.

Specifically, the CPU 101 is able to control the vibration generation unit 110 to generate vibrations, when the horizontal coordinate of the display position of the page boundary 208 equals the horizontal coordinate defining the boundary passage determination position P2 during leftward scrolling of the display screen. Alternatively, vibrations may be generated when the horizontal coordinate of the display position of the page boundary 208 change from a state of being greater than the horizontal coordinate defining the boundary passage determination position P2 to a state of being less than or equal to the horizontal coordinate defining the boundary passage determination position P2.

Operations of the CPU 101 according to the scroll display operation mentioned above will be described using the flowchart shown in FIG. 3.

At S301, the CPU 101 checks the touch panel 106*a* of the operation unit 106 and determines whether there has been a touch-down. The processing advances to S302 if a touch-down is detected. If a touch-down is not detected, the CPU 101 repeats the end event detection of S313 and the touch-down detection of S301.

At S302, the CPU 101 determines whether the position where the touch-down was detected at S301 is within the draggable area 202, and advances the processing to S303 if the position is within the draggable area 202. If a touch-down is detected in a non-draggable area, the CPU 101 advances processing to S313, and performs touch-down detection again at S301 if an end event is not detected at S313.

At S303, the CPU 101 checks the touch panel 106*a*, and determines whether a drag operation has been performed. If a drag operation has been performed, the CPU 101 stores the coordinates of the start point and the end point of the drag operation in the last predetermined period (e.g., most recent touch position sampling interval for drag determination and 2 intervals prior to that) in the memory 102, and advances processing to S304. If a drag operation has not been performed, the CPU 101 advances processing to S315.

At S304, the CPU 101 determines the direction in which the drag operation detected in S303 was performed. Specifically, the CPU 101 reads out the coordinates of the start point and the end point of the drag in the last predetermined period from the memory 102, and determines the drag direction to be to the right if the horizontal coordinate of the start point is smaller than the horizontal coordinate of the end point and to the left if this is not the case. The CPU 101 advances processing to S305 if the drag direction is determined to be to the right and to S306 if the drag direction is determined to be to the left.

At S305, the CPU 101 sets the boundary passage determination position to P1, and advances the processing to S307.

At S306, the CPU 101 sets the boundary passage determination position to P2, which is positioned on the right side of the display area (upstream side in the scroll direction resulting from the drag) compared to P1, and advances the processing to S307.

At S307, the CPU 101 controls the image processing unit 104 to scroll the thumbnail image display screen according to the drag distance and the drag direction. Specifically, the CPU 101 reads out the coordinates of the start point and the end point of the drag in the last predetermined period from the memory 102, and takes a value obtained by subtracting the start point from the end point as the scroll amount. The CPU 101 scrolls the display images to the right by the scroll amount if the scroll amount is positive and to the left if the scroll amount in negative, and advances processing to S308.

At S308, the CPU 101 determines whether the page boundary has passed through the boundary passage determination position set in S305 or S306.

For example, the CPU 101 monitors the horizontal coordinate of the position corresponding to the boundary between pages (hereinafter, boundary position) in the display object that is being scrolled. The CPU 101 then determines that the page boundary has passed through the boundary passage determination position, when the horizontal coordinate of the boundary position changes from a state of being less than or equal to the horizontal coordinate of the boundary passage determination position P1 to a state of exceeding the horizontal coordinate thereof, in the case where the drag direction was to the right. Also, the CPU 101 determines that the page boundary has passed through the boundary passage determination position, when the horizontal coordinate of the boundary position change from a state of being larger than the horizontal coordinate of the boundary passage determination position P2 to a state of being less than or equal to the horizontal coordinate thereof, in the case where the drag direction is to the left. The CPU 101 advances the processing to S309 if it is determined that the page boundary has passed through the boundary passage determination position, and advances the processing to S312 if it is not determined that the page boundary has passed therethrough.

At S309, the CPU 101 determines the type of page boundary that was determined to have been passed at S308, and advances the processing to S310 if the boundary is a "month" boundary and to S311 if the boundary is a "day" boundary.

At S310, the CPU 101 controls the vibration generation unit 110 to generate a "stronger" tactile sensation. That is, the CPU 101 generates stronger vibrations than the vibrations that are generated at S311. Thereafter, the CPU 101 advances the processing to S312.

At S311, the CPU 101 controls the vibration generation unit 110 to generate a "weaker" tactile sensation. That is, the CPU 101 generates weaker vibrations than the vibrations that are generated at S310. Thereafter, the CPU 101 advances the processing to S312.

At S312, the CPU 101 checks the touch panel 106a and determines whether a touch-up has been detected, and advances the processing to S313 if a touch-up is detected and to S314 if a touch-up is not detected.

At S313, the CPU 101 checks whether an end event, such as a command to switch from display of a thumbnail display screen to other screen display, for example, has been detected. The CPU 101 ends the processing if an end event is detected, and returns the processing to S301 if an end event is not detected.

At S314, the CPU 101 checks the touch panel 106a and determines whether a drag operation has been detected, and advances the processing to S307 if a drag operation is detected and to S312 if a drag operation is not detected. Here, because the processing advances to S307 if a drag is detected at S314, the boundary passage determination position does not change unless a touch-up is detected at S312. This means that the position where the user feels the tactile sensation will be the same with respect to the same boundary, even in the case where the user changes from dragging from right to left to dragging from left to right while touching the touch panel, that is, changes the scroll direction while touching the touch panel. This prevents unnaturalness in terms of the position where the user feels the tactile sensation changing with respect to the same boundary during one touch operation.

At S315, the CPU 101 determines whether there was a touch-up. The processing advances to S313 if there is a touch-up, and advances to S303 if there is not a touch-up.

In the present embodiment, as described above, a tactile sensation is provided by vibrating the apparatus, when the boundary position preset on the display screen passes through a predetermined position when scrolling the display screen. Thus, the user is easily able to grasp that a page boundary has been crossed by scrolling, when the screen being scrolled is constituted by a plurality of pages. At this time, scrolling is not temporarily stopped, and thus the user is not made to wait even when a plurality of boundaries have been set. Also, since the boundaries between pages are monitored within the apparatus, design of the display screen is not affected. Furthermore, although the use of methods other than display to notify the boundary position, such as audio guidance, for example, is conceivable, there is concern that audio guidance could be a nuisance for anyone nearby, as well as possibly being difficult to hear in noisy places. In contrast, in this and other embodiments, there is no such concern, since the user is notified that the position of a boundary has been crossed by a tactile sensation.

Also, detailed information can be conveyed to the user by changing the size and pattern of the vibrations that generated depending on the type of boundary. For example, in the case where pages are allocated by date, as described above, by generating different vibrations when the boundary between pages is a "day" boundary but not a "month" boundary (lower-rank boundary) from when the boundary between pages corresponds to a "month" boundary (upper-rank boundary), the date can be estimated to some extent only with vibrations. Note that in the case where the page boundary corresponds to a "year" boundary, yet another type of vibration may be generated. Also, the type of boundary is not limited to date, and any type of boundary can be used. For example, in the case where images are sorted based on position information indicating the shooting location added to the images, a strong tactile sensation may be generated when a "country" (upper rank) boundary is crossed, and a weak tactile sensation may be generated when a "state" (lower rank) is crossed. Note that although the processing of FIG. 3 described an example using vibrations generated by the vibration generation unit 110 as tactile sensations, it should be obvious that vibrations may be replaced using electrical stimulation that is generated by the haptic feedback generator 111.

The method of the present embodiment is applicable not only to scrolling by a drag operation but to momentum scrolling by a flick operation. Momentum scrolling is a display technique for continuing to scroll even after a touch-up, while gradually reducing the scroll speed, according to the move speed and distance at the time of a flick operation. In this case, vibrations can be generated in the case where the page boundary passes through a predetermined position not only during the flick operation but also during scrolling after a touch-up. Since the entire apparatus is vibrated, the user is able to feel the vibrations through the hand that is holding the apparatus, even if the finger that performs the touch operation is not touching the touch panel.

Figure 4:
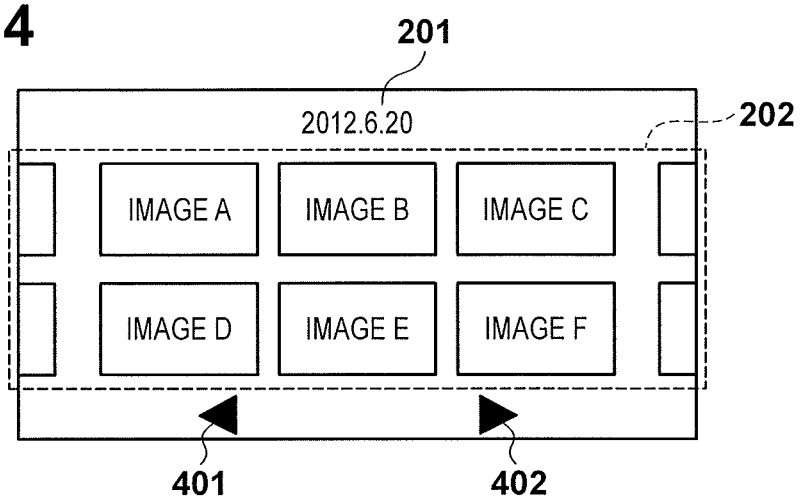
FIG. 4 is a diagram showing another exemplary thumbnail display screen according to embodiments of the present invention.

The method of the present embodiment is also applicable in the case where the display screen is scrolled with a tap operation of scroll buttons 401 and 402 (touch items) that are displayed on the screen, as shown in FIG. 4, for example, rather than by an operation accompanying a move, such as a drag operation or a flick operation. The scroll button 401 is a button for giving a command to scroll the display screen to the left and the scroll button 402 is a button for giving a command to scroll the display screen to the right, and the screen can be scrolled not only by a drag operation in the area 202 but also by operating these scroll buttons. In the case where scrolling is performed according to a tap operation of a scroll button, the CPU 101 is able to determine the scroll direction and the scroll amount, according to which of the scroll buttons was touched and for how long. Thereafter, passage through page boundaries can be determined as described above while scrolling the display according to the determined scroll direction and scroll amount.

Second Embodiment

Next, a second embodiment of the present invention will be described. In the first embodiment, the entire apparatus was vibrated by the vibration generation unit 110 in order to provide a tactile sensation to the user, whereas the present embodiment describes an example in which a tactile sensation is provided by the haptic feedback generator 111 instead. An electrical tactile sensation generated by the haptic feedback generator 111 cannot be perceived by the hand holding the apparatus (not touching the touch panel 106a). In other words, a tactile sensation cannot be provided using the haptic feedback generator 111 unless the user is touching the touch panel 106a with a finger. Note that this can be said to be the same problem as when the vibration generation unit 110 is of a type that is able to make the user feel the vibrations through only his or her finger touching the touch surface of the touch panel 106a.

When scrolling the display with a drag operation, a configuration can simply be adopted in which the haptic feedback generator 111 is used instead of the vibration generation unit 110 in the first embodiment, since the user's finger is continuously touching the touch panel 106a. Electrical tactile sensations that differ according to the type of boundary can also be provided in this case.

Figure 5A:
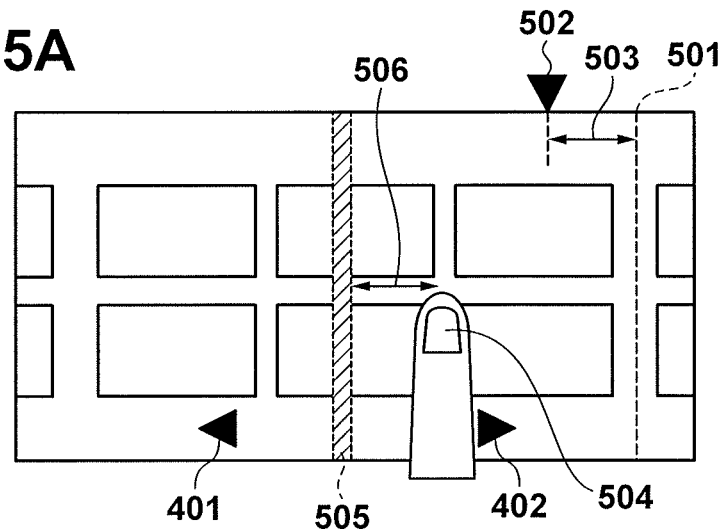
FIGS. 5A and 5B are diagrams showing exemplary tactile sensation generation positions in a display control apparatus according to a second embodiment of the present invention.

FIG. 5A shows an example of the position where a tactile sensation is generated when a drag operation is performed to the left in the area 202 of the touch panel 106a on the thumbnail display screen shown in FIG. 4, and the display screen is scrolled to the left. A distance 503 represents the distance between a page boundary 501 and the boundary passage determination position P2 shown by a mark 502.

In the case where the drag operation is started from a position 504, a tactile sensation is generated at a tactile sensation generation position 505. The tactile sensation generation position 505 is defined as a band in a vertical direction of the screen (direction perpendicular to draggable direction). The tactile sensation generation position 505 changes position in the horizontal direction according to the drag start position 504 (but does not change after the drag has started, i.e., during the drag). A distance 506 represents the distance between the drag start position 504 and the tactile sensation generation position 505. The tactile sensation generation position 505 is determined by the CPU 101 such that this distance 506 equals the distance 503 between the page boundary 501 and the boundary passage determination position P2 shown by the mark 502. The user's finger thereby cuts horizontally across the tactile sensation generation position 505 that is positioned as a belt-like line in the vertical direction of the screen, when the shooting day of the displayed thumbnail images changes as a result of the drag operation by the user. As a result, when the page boundary passes through the boundary passage determination position, a tactile sensation that feels to the user as if his or her finger is passing over a frame that physically exists can be provided.

A configuration that uses the haptic feedback generator 111 instead of the vibration generation unit 110 can also be adopted in the case of a configuration that only scrolls display when a touch-on state is detected, even with scroll display performed by a tap operation of the scroll buttons 401 and 402 as shown in FIG. 4.

It is, however, conceivable for the user to perform a tap operation of a scroll button (scroll button is touched for a short time) while bringing finger into and out of contact with the touch panel 106a. Thus, an electrical tactile sensation may possibly not be adequately conveyed to the finger in some cases. Also, in the case where there is a time lag between the touch operation on the scroll button and the scroll display corresponding to the touch operation, the finger may out of contact with the touch panel 106a, when the page boundary passes through the boundary passage determination position.

For example, the finger may be out of contact with the touch panel 106a, when the page boundary passes through the boundary passage determination position, in the case where:
- scrolling is accelerated the longer the scroll button is touched, and momentum scrolling is performed after a touch-up;
- display is scrolled after a touch-up is detected, by an amount that depends on the time from touch-down detection to touch-up detection;
- display is scrolled by a predetermined amount each time a tap operation is performed (scrolling is started when a touch-down state is detected and thereafter display is scrolled by a given amount irrespective of the time until a touch-up is detected).

In the present embodiment, the scheduled scrolling amount is immediately calculated, when a touch-down is detected in a scroll button area. In the case where it is judged that the page boundary will pass through the boundary passage determination position during scrolling by the scheduled scrolling amount, a tactile sensation is generated before it is determined that the page boundary has actually passed through the boundary passage determination position. The possibility of being able to provide a tactile sensation to the user can thereby be increased, even in the case where there is a possibility that the user's finger will be out of contact with the touch panel at the point in time that the page boundary actually passes through the boundary passage determination position.

Figure 5B:
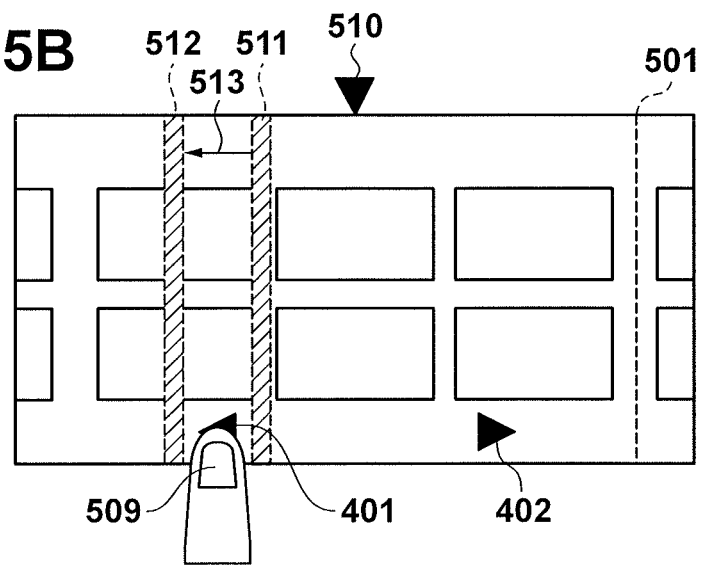

FIG. 5B is a diagram showing an exemplary tactile sensation generation position when the scroll button 401 corresponding to leftward scrolling is tapped on the thumbnail display screen shown in FIG. 4 and the display screen is scrolled to the left. A mark 510 represents the boundary passage determination position P3. A position 509 represents the position touched by the user's finger when tapping the scroll button 401.

With a touch operation on a scroll button, the position 509 of the user's finger does not move (lest it be regarded as a drag operation). Thus, in the present embodiment, a tactile sensation that feels to the user as if his or her finger is passing over a frame that physically exists is provided, similarly to when a drag operation is performed, by moving the tactile sensation generation position in the scroll direction from a tactile sensation generation start position 511 to a tactile sensation generation end position 512, as shown by an arrow 513. The CPU 101 thus controls the haptic feedback generator 111 so as to move the tactile sensation generation position in the same direction as the direction in which the screen is scrolled. The tactile sensation generation start position 511 and the tactile sensation generation end position 512 can be set to any positions that sandwich the scroll button. In order, however, to provide a tactile sensation to the finger touching the scroll button before the finger touches up, the tactile sensation generation start position 511 desirably is set to a position as close to the scroll button as possible. The tactile sensation generation start position can at least be set to be a shorter distance from the scroll button than the distance that is scrolled with one tap.

Figure 6A:
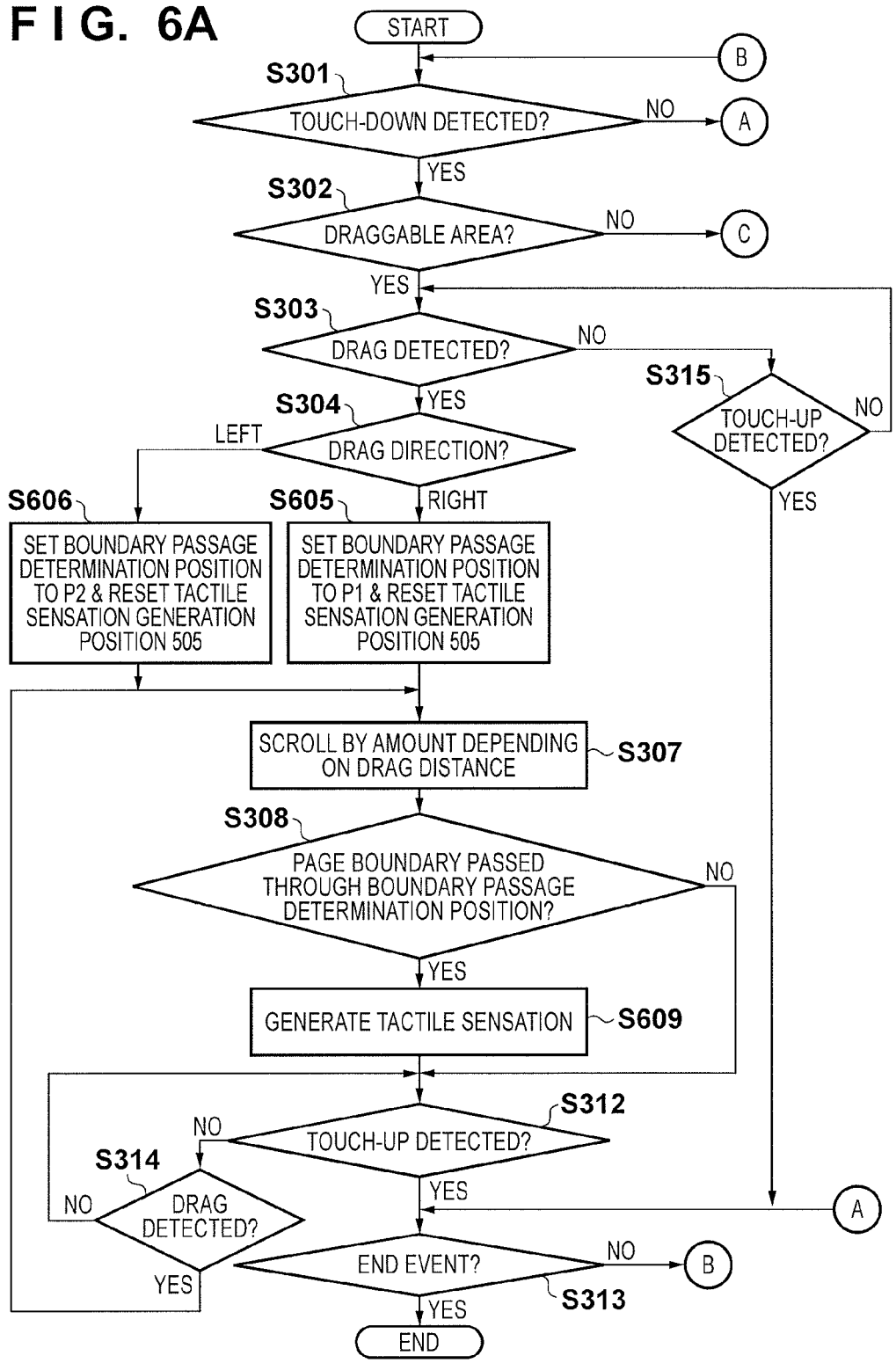

Operations of the CPU 101 for realizing the abovementioned tactile sensation control operation of the present embodiment will be described using the flowcharts shown in FIGS. 6A and 6B.

Note that coordinates are also given in the horizontal direction of the screen in the present embodiment, similarly to the first embodiment, and the boundary passage determination positions P1 and P2 are similarly defined. Note that since the determination processing performed when a boundary passes through the boundary passage determination position and the specific method of determining the drag direction are similar to the first embodiment, description thereof is omitted here.

Also, since the operations in response to a drag operation are basically the same as the first embodiment, the same reference numerals as FIG. 3 are given and description thereof is omitted.

At S302, the CPU 101 determines whether the position where the touch-down was detected at S301 is a draggable area. The processing is advanced to S303 if a draggable area, and is advanced to S613 if a non-draggable area.

The processing from S303 onwards is similar to the first embodiment except for the following points.

In S605, the tactile sensation generation position 505 is set, in addition to setting the boundary passage determination position P1. As described above, the tactile sensation generation position 505 is set to a position that is separated, in the drag direction (left), from the position (drag start position) 504 of the finger at the time of that the drag was started, by the distance 506 which is equal to the distance 503 between the boundary 501 and the boundary passage determination position P1.

In S606, the tactile sensation generation position 505 is set, in addition to setting the boundary passage determination position P2. As described above, the tactile sensation generation position 505 is set to a position that is separated, in the drag direction (right), from the position (drag start position) 504 of the finger at the time that the drag was started, by a distance that is equal to the distance between the boundary 501 and the boundary passage determination positions P2.

Steps S309 to S311 in FIG. 3 have been replaced by S609.

At S609, the CPU 101 controls the haptic feedback generator 111 to generate a tactile sensation at the tactile sensation generation position 505 set at S605 or S606 (tactile sensation is provided to the finger of the user touching the tactile sensation generation position). Note that, similarly to the first embodiment, the tactile sensation that is generated may be changed according to the type of boundary. For example, if a slightly coarse tactile sensation is provided at a "day" boundary and a much coarser (bumpier) tactile sensation than for the "day" boundary is provided at a "month" boundary, the user will know what type of boundary has been crossed, and looking for a desired image will be facilitated.

Since the processing from S312 onwards is similar to the first embodiment, description thereof is omitted.

If it is determined at S302 that the detected touch-down is outside the draggable area, the CPU 101, at S613, determines whether the position where the touch-down was detected at S301 is within a scroll button area. The CPU 101 advances the processing to S614 if the touch-down is detected in a scroll button area and to S313 if this is not the case.

At S614, the CPU 101 sets the boundary passage determination position P3 (position corresponding to the mark 510 in FIG. 5B) and advances the processing to S615.

At S615, the CPU 101 calculates the scheduled scrolling amount. At S616, the CPU 101 determines whether the boundary passage determination position exists within a range of the scheduled scrolling amount from the current position of the page boundary (whether the page boundary will pass through the boundary passage determination position during scrolling by the scheduled scrolling amount). The processing is advanced to S617 if it is determined that the page boundary will pass through the boundary passage determination position during scrolling by the scheduled scrolling amount, and to S623 if this is not the case.

The calculation of the scheduled scrolling amount of S615 and the determination of S616 can be executed with contents and at a timing that depend on what type of scroll operation is to be performed upon the operation of the scroll button. Here, it is assumed that display is scrolled by a predetermined fixed amount each time a tap operation is performed, in which case the scheduled scrolling amount will equal the predetermined fixed amount. Note that in the case where scrolling of an amount that depends on the time from touch-down detection to touch-up detection is performed after the touch-up is detected, the CPU 101 measures the time for which touch-down is detected continuously from touch-down detection. Meanwhile, the scheduled scrolling amount can be sequentially updated based on the predetermined scroll speed and the measured time, and the determination can be performed with respect to the updated scheduled scrolling amount. Even in the case where the scheduled scrolling amount is not derived before the start of scrolling, the subsequent scroll amount can be periodically calculated while scrolling, and it can be determined whether the page boundary will pass through the boundary passage determination position.

At S617, the CPU 101 controls the haptic feedback generator 111 to generate a tactile sensation at the tactile sensation generation start position, and thereafter advances the processing to S618. As FIG. 5B described, the tactile sensation generation start position is set as a belt-like line in the vertical direction of the screen, and the horizontal position thereof is set so as to be located in the opposite direction to the scroll direction from the current position of the finger.

At S618, the CPU 101 determines whether a touch-up has been detected on the touch panel 106a, and advances the processing to S623 if a touch-up is detected and to S619 if a touch-up is not detected.

At S619, the CPU 101 controls the haptic feedback generator 111 to move the position where a tactile sensation is generated. This position is moved in the same direction as the direction in which the screen is scrolled. The movement speed may also be the same as the scroll speed. In other words, the CPU 101 moves the tactile sensation generation position to the left side, in the case where tap operation of the scroll button 401 (reduce coordinates of tactile sensation generation position by fixed amount). Also, the CPU 101 moves the tactile sensation generation position to the right side, in the case where the scroll button 402 is tapped (increase coordinates of tactile sensation generation position by fixed amount). The CPU 101 then advances the processing to S620.

At S620, the CPU 101 determines whether the tactile sensation generation position has reached the tactile sensation generation end position, and advances the processing to S623 if reached and to S621 if not reached.

At S621, the CPU 101 determines whether scrolling of the scheduled scrolling amount has been performed, and advances the processing to S618 if performed and to S622 if not performed.

At S622, the CPU 101 scrolls the thumbnail display screen by a fixed amount in a designated direction, and returns the processing to S618.

If a touch-up is detected at S618, the CPU 101, at S623, determines whether scrolling of the scheduled scrolling amount is completed, and advances the processing to S313 if completed and to S624 if not completed.

At S624, the CPU 101 scrolls the thumbnail display screen by a fixed amount in a designated direction, and returns the processing to S623.

Although the page boundary will pass through the boundary passage determination position P3 during scrolling by the scheduled scrolling amount, generation of the tactile sensation is started before scrolling is started (S617), and thus the tactile sensation can most likely be provided before the user touches up. Note that, here, the tactile sensation generation position is moved in accordance with the scrolling. However, the effect of informing the user that a page boundary exists with a tactile sensation can be realized, even simply by generating a tactile sensation at S617 with respect to the position that is being touched (touch position) (in this case, processing of S619 and S620 is omitted), without moving the tactile sensation generation position. Compared with the method that moves the tactile sensation generation position, the method that generates a tactile sensation at the touch position at S617 is advantageous in terms of being able to reliably provide a tactile sensation before a touch-up, although identifying the scroll direction by the tactile sensation is difficult.

Thus, according to the present embodiment, it is possible to inform the user that there is a page boundary, which in abovementioned example represents a change in the shooting day of the displayed thumbnail images, with the tactile sensation of the finger touching the touch surface, in the case of both a drag operation and a button operation. Also, a tactile sensation that feels to the user as if his or her finger is passing over a frame that physically exists can be provided, by changing the generation position and the generation method of the tactile sensation according to the type of operation with which the screen is scrolled.

Third Embodiment

Next, a third embodiment of the present invention will be described. In the third embodiment, a configuration is adopted in which, in the case of scrolling a settings screen containing a plurality of menu items of different categories, the category boundary and type are notified with a tactile sensation.

Figure 7:
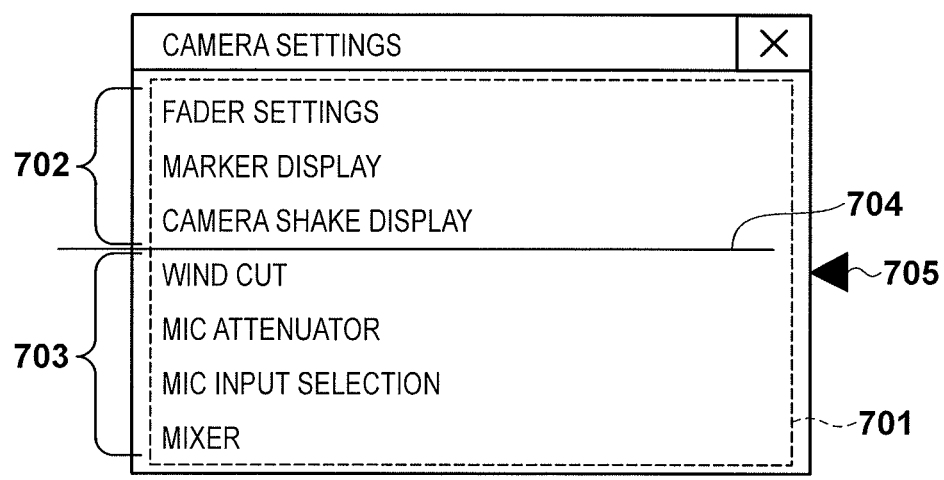
FIG. 7 is a diagram showing an exemplary settings screen containing a plurality of items in a third embodiment of the present invention.

FIG. 7 is diagram showing an exemplary display of a settings screen in the present embodiment. Reference numeral 701 denotes an area in which a drag operation is acceptable, and display of menu item groups is scrolled up and down when a drag operation in the vertical direction is detected in this area. Reference numeral 702 denotes a menu item group related to screen display (belonging to a display category) and reference numeral 703 denotes a menu item group related to sound (belonging to an audio category), among a plurality of menu items contained on settings screen. Note that it is assumed that there is a menu item group belonging to an operation category that will not be displayed unless the settings screen is scrolled. Reference numeral 704 denotes the page boundary between the display category and the audio category. There is also a page boundary between the audio category and the operation category. The solid line indicated by 704 is illustrated in order to comprehend the position of the boundary, and may be displayed in practice but does not need to be. A mark 705 indicates the boundary passage determination position. In the present embodiment, the CPU 101 controls the vibration generation unit 110 or the haptic feedback generator 111 to generate a tactile sensation that depends on the category to which the menu item corresponding to the boundary passage determination position belongs.

The correspondence relationship between categories and tactile sensations can be pre-saved in the nonvolatile memory 103 in the form of a table (hereinafter, tactile sensation correspondence table) in which categories and tactile sensations are associated as follows, for example. The CPU 101 determines the tactile sensation to be generated by controlling the vibration generation unit 110 or the haptic feedback generator 111, with reference to this table.

| Tactile Sensation Correspondence Table | |
| --- | --- |
| Category | Type of Tactile Sensation |
| Audio | Tactile Sensation A |
| Display | Tactile Sensation B |
| Operation | Tactile Sensation C |

Figure 8:
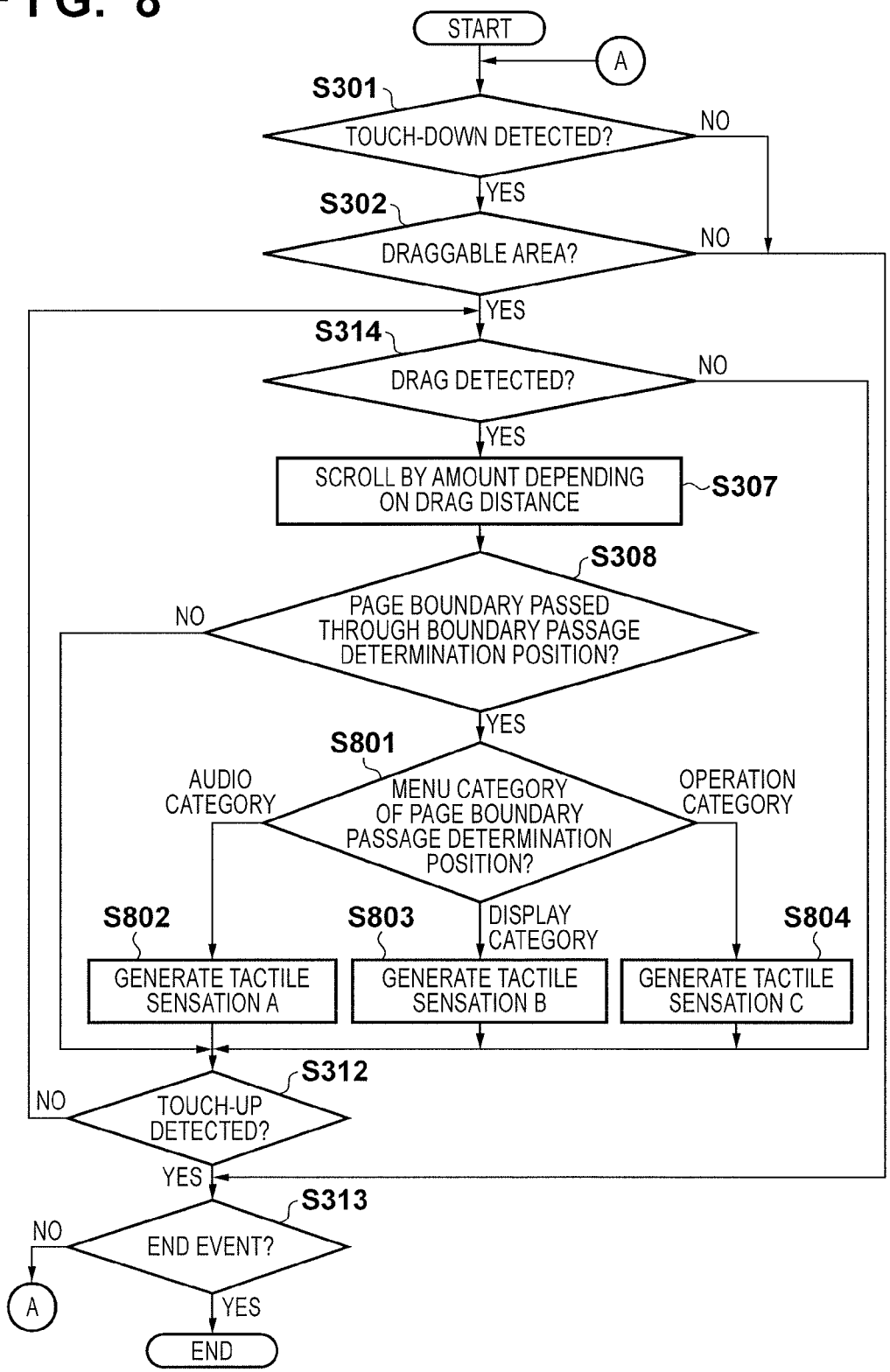
FIG. 8 is a flowchart for illustrating scroll display operations in the display control apparatus according to the third embodiment of the present invention.

Operations of the CPU 101 according to the vibration generation control in the present embodiment will be described using the flowchart shown in FIG. 8. Note that similar reference numerals to FIG. 3 are given to processing that is similar to the first embodiment, such as the specific method of determining whether a boundary has passed through the boundary passage determination position, and description thereof is omitted. The present embodiment is characterized by operations performed when a drag operation in a draggable area is detected.

Processing from the detection of a touch-down state of S301 to the determination of whether the page boundary has passed through the boundary passage determination position at S308 is similar to the first embodiment. If it is determined at S308 that the page boundary has passed through the boundary passage determination position, the CPU 101, at S801, determines the category to which the menu item corresponding to the boundary passage determination position belongs.

The CPU 101 advances the processing to S802 if the menu item located at the boundary passage determination position is a menu item of the audio category, to S803 if a menu item of the display category, and to S804 if a menu item of the operation category.

At S802, the CPU 101 controls the vibration generation unit 110 or the haptic feedback generator 111, with reference to the tactile sensation conversion table in the nonvolatile memory 103, to generate the tactile sensation A corresponding to the audio category, and thereafter advances the processing to S312.

At S803, the CPU 101 controls the vibration generation unit 110 or the haptic feedback generator 111, similarly to S802, to generate the tactile sensation B, and thereafter advances the processing to S312.

At S804, the CPU 101 controls the vibration generation unit 110 or the haptic feedback generator 111, similarly to S802, to generate the tactile sensation C, and thereafter advances the processing to S312. Since the processing from S312 onwards is similar to the first embodiment, description thereof is omitted.

According to the present embodiment, a tactile sensation that indicates what category the displayed menu items belong is thus generated. Thus, the user is able to know by a tactile sensation that the category has changed, even when scrolling the menu screen at high speed (e.g., at a speed at which the items cannot be read), thereby facilitating the search for a desired item. It is also no longer necessary to employ screen design lacking a sense of unity, such as where the display color is changed for each category.

Note that the tactile sensation that is generated at S803 and S804 may, after having been generated when the page boundary (category boundary) passes through the boundary passage determination position, be stop after a given time period if the category to which the menu item corresponding to the boundary passage determination position belongs does not change. Alternatively, the tactile sensation may be continuously generated until the screen changes to other screen.

Other Embodiments

The abovementioned embodiments of the present invention were described, taking display of a thumbnail display screen and a menu screen as an example. However, the present invention can be applied with respect to any display contents. For example, the abovementioned configuration may be used in order to notify a boundary such as pages, sections, chapters or arbitrary user-designated bookmarks to the user, when scrolling display of a document file. The type of boundary can also be notified in this case by notifying tactile sensations that differ according to the type of boundary. The present invention is also applicable when viewing Web pages in a web browser.

Also, although only the case where the boundary is defined by a straight line was described, the boundary may be defined by any other form. For example, when scrolling display of a map, the borders between administrative districts, such as prefectural borders, can be set as boundaries. In this case, tactile sensations can be provided according to the type of boundary, such as prefectural borders, city boundaries, town boundaries, and the like.

Note that the control described as being performed by the CPU 101 in the above-mentioned embodiments may be performed by one CPU or may be realized by a plurality of CPUs sharing the processing.

Also, although the present invention has been described in detail based on preferred embodiments of the invention, the present invention is not limited to these specific embodiments, and various forms within a scope that does not deviate from the gist of the invention are also encompassed within the invention. Furthermore, each of the abovementioned embodiments merely illustrates one embodiment of the present invention, and these embodiments may be combined as appropriate.

Also, although the case where the present invention is applied to a display control device was described as an example in the above-mentioned embodiments, the present invention is applicable to any apparatus having a user interface that uses a touch panel. Non-limiting examples of electronic devices to which the present invention is applicable include the following: personal computers, PDAs, mobile phones, portable image viewers, printer apparatuses equipped with a display, digital photo frames, music players, game machines, electronic book readers, home electronics and the like having a touchpad.

Also, the present invention is also applicable to an apparatus having an operation member for performing a scrolling operation other than a touch panel. For example, the present invention is applicable to a personal computer having a mouse equipped with a haptic feedback generator that can provide a tactile sensation to a hand operating the mouse. A scrolling command can be given in response to a mouse operation, and a tactile sensation can be provided to the user through the mouse, in the case where a boundary of a scroll target (display object) is crossed by scrolling, as described in the processing of each of the above-mentioned embodiments. Similarly, the present invention is also applicable to a game machine equipped with a controller that is able to provide tactile sensations to a hand operating the controller.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-109389, filed on May 23, 2013, which is hereby incorporated by reference herein its entirety.

What is claimed is:

1. A display control apparatus comprising:
    a processor; and
    a memory storing a program which, when executed by the processor, causes the display control apparatus to:
    display some of a plurality of items on a screen, wherein the plurality of items are sorted by a category having a plurality of ranks and displayed according to a first rank of the plurality of ranks;
    when the screen is scrolled by a scrolling operation by a user, move the displayed items to change items displayed on the screen;
    generate stimulation perceivable as a tactile sensation to the user who operates the display control apparatus, wherein the stimulation is generated when a border between different values of a same rank or when a border between different values of different ranks passes a predetermined position, wherein the tactile sensation is generated at a tactile sensation generation position of the screen, said tactile sensation generation position being determined based on a scrolling start position and border and the predetermined position;
    determine if the border will pass through the predetermined position during the scrolling operation;
    calculate a scheduled scrolling amount;
    determine whether the predetermined position exists within a range of the scheduled scrolling amount from a current position of the border;
    wherein in a case that it is determined that the border will pass through the predetermined position during the scrolling operation, the tactile sensation is generated before the border passes through the predetermined position; and
    control to cause a first stimulation in a case where the border that passes the predetermined position is the border between different values of a first rank, and control to cause a second stimulation in a case where a border that passes the predetermined position is the border between different values of a second rank which is a higher rank than the first rank in the plurality of ranks, the second stimulation being stronger than the first stimulation.

2. The display control apparatus according to claim 1, wherein the display control apparatus sorts and displays the plurality of display items based on a unit relating to time.

3. The display control apparatus according to claim 1, wherein the stimulation is a vibration stimulation.

4. The display control apparatus according to claim 1, wherein the stimulation electrical stimulation.

5. The display control apparatus according to claim 1, wherein the screen is scrolled by a touch operation performed on a touch panel.

6. The display control apparatus according to claim 1, wherein the display control apparatus differs strength of the stimulation depending on whether a border passes the predetermined position is the border between different values of a same rank or the border between different ranks.

7. The display control apparatus according to claim 1, wherein the tactile sensation is generated as a band shape banding in a vertical direction of the screen.

8. The display control apparatus according to claim 1, wherein the tactile sensation generation position varies in a horizontal direction according to the scrolling start position.

9. A method of controlling a display control apparatus comprising;
    displaying some of a plurality of items on a screen, wherein the plurality of items are sorted by a category having a plurality of ranks and displayed according to a first rank of the plurality of ranks;
    when the screen is scrolled by a scrolling operation by a user, moving the displayed items to change items displayed on the screen;
    generating stimulation perceivable as a tactile sensation to the user who operates the display control apparatus, wherein the stimulation is generated when a border between different values of a same rank or when a border between different values of different ranks passes a predetermined position, wherein the tactile sensation is generated at a tactile sensation generation position of the screen, said tactile sensation generation position being determined based on a scrolling start position and is located at a distance from the scrolling start position equal to a distance between the border and the predetermined position;
    determining if the border will pass through the predetermined position during the scrolling operation;
    calculating a scheduled scrolling amount;
    determining whether the predetermined position exists within a range of the scheduled scrolling amount from a current position of the border;
    wherein in a case that it is determined that the border will pass through the predetermined position during the scrolling operation, the tactile sensation is generated before the border passes through the predetermined position; and
    controlling to cause a first stimulation in a ease where a border that passes the predetermined position is the border between different values of a first rank, and controlling to cause a second stimulation in a case where a border that passes the predetermined position is the border between different values of a second rank which is a higher rank than the first rank in the plurality of ranks, the second stimulation being stronger than the first stimulation.

10. The display control apparatus according to claim 6, wherein the display control apparatus generates stronger stimulation when the border between different ranks passes the predetermined position than when the border between different values of a same rank passes the predetermined position.

11. The method of controlling a display control apparatus according to claim 9, wherein the tactile sensation is generated as a band shape banding in a vertical direction of the screen.

12. The method of controlling a display control apparatus according to claim 9, wherein the tactile sensation generation position varies in a horizontal direction according to the scrolling start position.

* * * * *